US012580222B2

(12) United States Patent
Matsushita et al.

(10) Patent No.: US 12,580,222 B2
(45) Date of Patent: Mar. 17, 2026

(54) METHOD OF MANUFACTURING BATTERY COMPONENT AND APPARATUS FOR MANUFACTURING BATTERY COMPONENT

(71) Applicant: HONDA MOTOR CO., LTD., Tokyo (JP)

(72) Inventors: Yayoi Matsushita, Saitama (JP); Yuichi Tajiri, Saitama (JP); Takehiro Fukushima, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1058 days.

(21) Appl. No.: 17/680,323

(22) Filed: Feb. 25, 2022

(65) Prior Publication Data

US 2022/0294011 A1 Sep. 15, 2022

(30) Foreign Application Priority Data

Mar. 15, 2021 (JP) ................................. 2021-041792

(51) Int. Cl.
H01M 10/0562 (2010.01)
H01M 4/139 (2010.01)
(Continued)

(52) U.S. Cl.
CPC ....... H01M 10/0562 (2013.01); H01M 4/139 (2013.01); H01M 10/0585 (2013.01); H01M 4/621 (2013.01); H01M 2300/0068 (2013.01)

(58) Field of Classification Search
CPC ............ H01M 10/0562; H01M 4/139; H01M 10/0585; H01M 4/621; H01M 2300/0068;
(Continued)

(56) References Cited

U.S. PATENT DOCUMENTS 3,861,963 A * 1/1975 Afrance .............. H01M 50/414
429/251
2006/0210874 A1 9/2006 Erhardt et al.
(Continued)

FOREIGN PATENT DOCUMENTS

CN 1742350 A 3/2006
CN 101796669 A 8/2010
(Continued)

OTHER PUBLICATIONS

Office Action issued Apr. 22, 2024 in the CN Patent Application No. 202210183976.1.

*Primary Examiner* — Nicholas A Smith

(74) *Attorney, Agent, or Firm* — CKC & Partners Co., LLC

(57) ABSTRACT

Provided are a method and an apparatus for manufacturing a battery component including a base having a three-dimensional structure at low manufacturing costs, the method and the apparatus enabling impregnation of the base with a solid electrolyte of uniform composition while preventing or inhibiting air from remaining inside the base. A method of manufacturing a battery component, including: a first step of positioning a base having a three-dimensional structure in an impregnation tank; and a second step of feeding a solid electrolyte slurry to the base positioned in the impregnation tank while keeping the solid electrolyte slurry flowing, thereby impregnating the base with the solid electrolyte slurry.

8 Claims, 4 Drawing Sheets

(a)        (b)        (c)        (d)

(51) Int. Cl.
*H01M 4/62* (2006.01)
*H01M 10/0585* (2010.01)

(58) Field of Classification Search
CPC ....... H01M 4/0416; H01M 2300/0065; H01M 2300/71; H01M 2300/74; H01M 2300/77; H01M 2300/94; H01M 10/0587; H01M 4/04; H01M 4/0404; H01M 4/0407
See application file for complete search history.

(56) References Cited

U.S. PATENT DOCUMENTS

| | | |
|---|---|---|
| 2010/0216019 A1 | 8/2010 | Morishima |
| 2010/0221965 A1 | 9/2010 | Katayama et al. |
| 2011/0183203 A1* | 7/2011 | Du ...................... H01M 4/1393 |
| | | 427/78 |
| 2012/0214040 A1 | 8/2012 | Tsutsumi et al. |
| 2022/0131231 A1* | 4/2022 | Du ...................... H01M 50/454 |

FOREIGN PATENT DOCUMENTS

| | | | |
|---|---|---|---|
| CN | 101821895 A | | 9/2010 |
| CN | 201799379 U | * | 4/2011 |
| CN | 102473903 A | | 5/2012 |
| JP | 2002151148 A | | 5/2002 |
| JP | 2004192888 A | | 7/2004 |
| JP | 2010138039 A | | 6/2010 |
| JP | 2014026747 A | | 2/2014 |
| JP | 2016062709 A | | 4/2016 |
| JP | 2018129307 A | | 8/2018 |
| JP | 2020024860 A | | 2/2020 |
| KR | 20000025359 A | | 5/2000 |
| KR | 20130012407 A | | 2/2013 |
| KR | 20160032530 A | | 3/2016 |
| KR | 20170027387 A | | 3/2017 |

* cited by examiner

201

301

401

METHOD OF MANUFACTURING BATTERY COMPONENT AND APPARATUS FOR MANUFACTURING BATTERY COMPONENT

This application is based on and claims the benefit of priority from Japanese Patent Application No. 2021-041792, filed on 15 Mar. 2021, the content of which is incorporated herein by reference.

BACKGROUND OF THE INVENTION

Field of the Invention

The present invention relates to a method of manufacturing a battery component and an apparatus for manufacturing such a battery component.

Related Art

In recent years, the demand for high-capacity, high-output batteries has been rapidly increasing due to the widespread use of electric and electronic devices of various sizes, such as automobiles, personal computers, and cell phones. For example, solid-state batteries including solid electrolyte materials are currently attracting attention because they are superior to conventional batteries including organic electrolyte solutions as electrolytes in that their electrolytes are non-flammable, which improves safety and in that they have higher energy density (see, for example, Patent Document 1).

A solid-state battery includes of a laminate in which a positive electrode layer, a solid electrolyte layer, and a negative electrode layer are stacked. The solid electrolyte layer has a function of conducting ions and a function as a separator to prevent a short circuit between the negative electrode active material layer and the positive electrode active material layer.

Here, for example, a solid electrolyte layer including a base having a three-dimensional structure, such as a non-woven fabric, is manufactured by impregnating the base with a slurry of solid electrolyte in an impregnation tank that can contain the slurry of solid electrolyte by using capillary action without generating any flow other than the convection flow that naturally occurs during immersion, from the viewpoint of handling and continuous productivity in the manufacturing process.

Patent Document 1: Japanese Unexamined Patent Application, Publication No. 2014-026747

SUMMARY OF THE INVENTION

However, conventional manufacture of solid electrolyte layers has the following problems. First, when the impregnation of the base having a three-dimensional structure is performed only by way of the natural convection, it is likely for air to remain inside the base having a three-dimensional structure. Since air remaining in the base adversely affects the battery performance, a long impregnation process is required to sufficiently remove the air from the base having a three-dimensional structure. Besides, it is necessary to prepare a larger amount of solid electrolyte slurry than the amount of slurry to be impregnated, which increases the manufacturing cost.

Since, in the impregnation tank, there is no flow of the solid electrolyte slurry except for the natural convection generated upon immersion of the base having a three-dimensional structure, small-size particles, for example, are selectively impregnated on the base having a three-dimensional structure. Further, the composition of the slurry becomes nonuniform, for example, in such a way that agglomeration of the slurry of solid electrolyte occurs in the impregnation tank, resulting in instability of the quality of the solid electrolyte layer.

An object of the present invention, which has been made in consideration of the aforementioned problems, is to provide a method and an apparatus for manufacturing a battery component including a base having a three-dimensional structure at low manufacturing costs, the method and the apparatus enabling impregnation of the base with a solid electrolyte of uniform composition while preventing or inhibiting air from remaining inside the base.

(1) An embodiment of the present invention provides a method of manufacturing a battery component, comprising: a first step of positioning a base having a three-dimensional structure in an impregnation tank; and a second step of feeding a solid electrolyte slurry to the base positioned in the impregnation tank while keeping the solid electrolyte slurry flowing, thereby impregnating the base with the solid electrolyte slurry.

(2) In the method of manufacturing a battery component according to (1), in the first step, the base may be positioned in the impregnation tank such that the longitudinal direction of the base becomes approximately parallel to the bottom surface of the impregnation tank.

(3) In the method of manufacturing a battery component according to (1) or (2), in the second step, the base may be impregnated with the solid electrolyte slurry while being moved approximately parallel to the bottom surface of the impregnation tank.

(4) In the method of manufacturing a battery component according to any one of (1) to (3), in the second step, the solid electrolyte slurry may be fed to the base while flowing such that the back side of the base facing the bottom surface of the impregnation tank is immersed in the solid electrolyte slurry and the front side of the base is exposed on the surface of the solid electrolyte slurry.

(5) An embodiment of the present invention provides an apparatus for manufacturing a battery component, including: an impregnation tank for containing a solid electrolyte slurry; a positioner for positioning a base having a three-dimensional structure in the impregnation tank; and a feeder for feeding the solid electrolyte slurry to the base positioned in the impregnation tank while keeping the solid electrolyte slurry flowing, thereby impregnating the base with the solid electrolyte slurry.

(6) In the apparatus for manufacturing a battery component according to (5), the positioner may position the base in the impregnation tank such that the longitudinal direction of the base becomes approximately parallel to the bottom surface of the impregnation tank.

(7) In the apparatus for manufacturing a battery component according to (5) or (6), the positioner may include a mover that moves the base approximately parallel to the bottom surface of the impregnation tank.

(8) In the apparatus for manufacturing a battery component according to any one of (5) to (7), the feeder may feed the solid electrolyte slurry to the base while keeping the solid electrolyte slurry flowing such that the back side of the base facing the bottom surface of the impregnation tank is immersed in the solid electrolyte slurry and the front side of the base is exposed.

The present invention provides the method and the apparatus for manufacturing a battery component including a base having a three-dimensional structure at low manufacturing costs, the method and the apparatus enabling impregnation of the base with a solid electrolyte of uniform composition while preventing or inhibiting air from remaining inside the base.

DETAILED DESCRIPTION OF THE INVENTION

One embodiment of the present invention will be described in detail below with reference to the attached drawings.

<Method of Manufacturing Battery Component>

Figure 1:
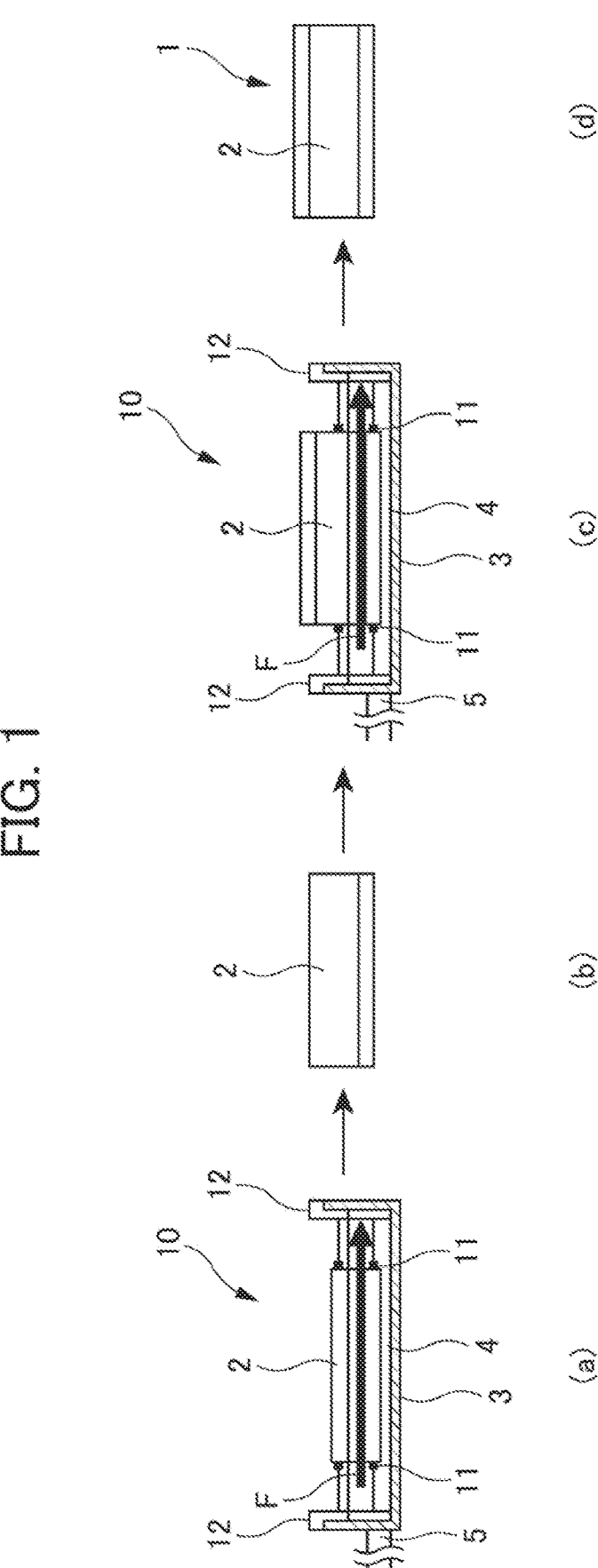
FIG. 1 is a diagram showing a method and an apparatus for manufacturing a solid electrolyte sheet according to one embodiment of the present invention.

FIG. 1 is a diagram showing a method of manufacturing a solid electrolyte sheet according to one embodiment of the present invention. A method of manufacturing a solid electrolyte sheet according to this embodiment is application of the method of manufacturing a battery component of the present invention to the method of manufacturing a solid electrolyte sheet. As shown in FIG. 1, the method of manufacturing a battery component according to this embodiment includes a first step of positioning and fixing a base having a three-dimensional structure (hereinafter also referred to simply as "base") in an impregnation tank, and a second step of feeding a solid electrolyte slurry so that it flows in the impregnation tank, thereby impregnating the base having a three-dimensional structure with the solid electrolyte slurry.

Figure 2:
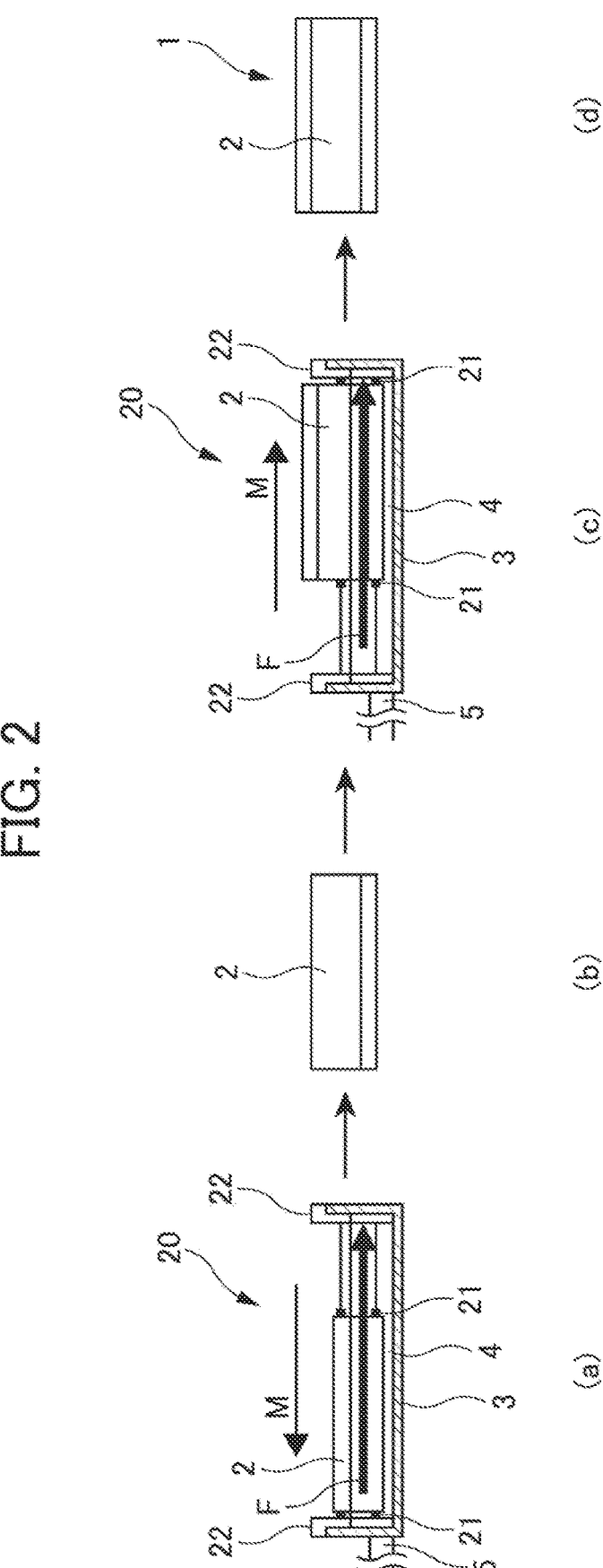
FIG. 2 is a diagram showing a method and an apparatus for manufacturing a solid electrolyte sheet according to another embodiment of the present invention.

FIG. 2 is a diagram showing a method of manufacturing a solid electrolyte sheet according to another embodiment of the present invention. As shown in FIG. 2, the method of manufacturing a battery component according to this embodiment includes a first step of positioning a base having a three-dimensional structure in an impregnation tank, and a second step of feeding a solid electrolyte slurry so that it flows and the base moves in the impregnation tank, thereby impregnating the base having a three-dimensional structure with the solid electrolyte slurry.

Figure 3:
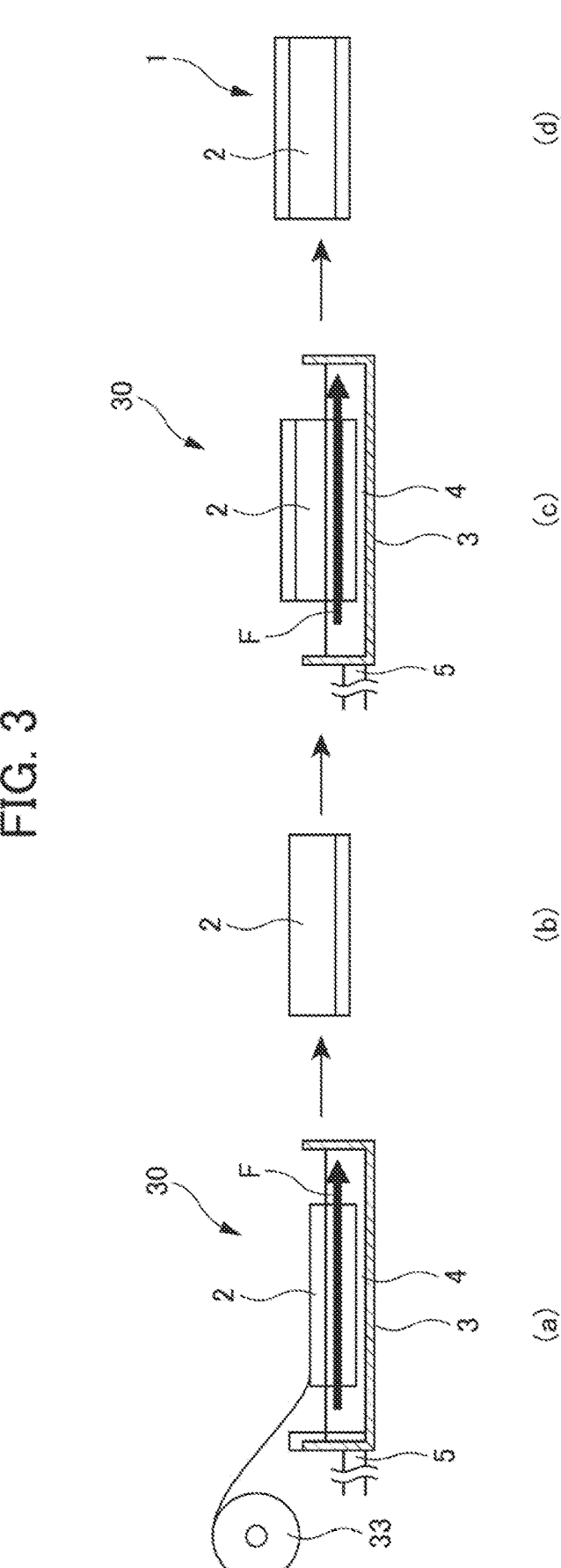
FIG. 3 is a diagram showing a method and an apparatus for manufacturing a solid electrolyte sheet according to still another embodiment of the present invention.
Figure 4:
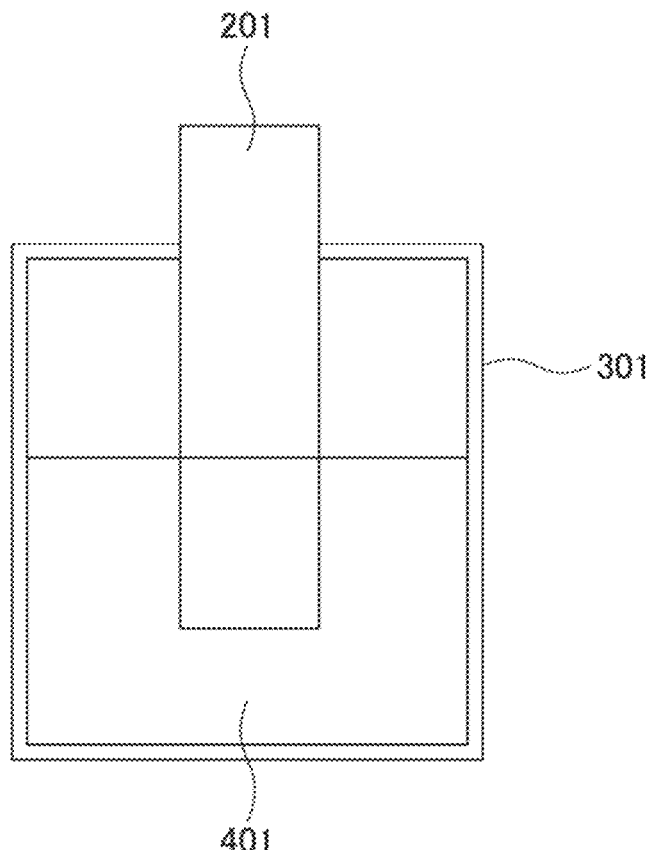
FIG. 4 is a diagram showing an example of a conventional method of manufacturing a solid electrolyte sheet.

FIG. 3 is a diagram showing a method of manufacturing a solid electrolyte sheet according to still another embodiment of the present invention. As shown in FIG. 3, the method of manufacturing a battery component according to this embodiment includes a first step of positioning a base having a three-dimensional structure in an impregnation tank, and a second step of feeding a solid electrolyte slurry so that it flows, thereby impregnating the base having a three-dimensional structure with the solid electrolyte slurry.

The method of manufacturing a battery component of the present invention includes the first step and the second step so that a pressure gradient occurs in a base having a three-dimensional structure, thereby impregnating solid electrolyte slurry while effectively pushing out air. Also, since the base having a three-dimensional structure can be continuously impregnated with solid electrolyte slurry of uniform composition, a large quantity of high-quality battery components can be manufactured at a high speed.

[First Step]

The first step is a step of positioning a base having a three-dimensional structure in an impregnation tank. In the method of manufacturing a battery component according to this embodiment, a base having a three-dimensional structure is impregnated with solid electrolyte slurry flowing in a certain direction, so that the base needs to be positioned in a slurry container in the impregnation tank. The first step enables uniform impregnation with solid electrolyte slurry while allowing air to be replaced and removed from the inside of the base having a three-dimensional structure in the second step. Also, a base having a three-dimensional structure can be uniformly filled with solid electrolyte slurry, which allows a high-quality battery component to be stably manufactured.

In addition, in this step, the base having a three-dimensional structure is preferably positioned in the impregnation tank so that the longitudinal direction of the base is approximately parallel with the bottom surface of the impregnation tank (see (a) and (c) in FIG. 1, (a) and (c) in FIG. 2, and, (a) and (c) in FIG. 3. Since the base is positioned in the impregnation tank so that the longitudinal direction of the base having a three-dimensional structure is approximately parallel with the bottom surface of the impregnation tank, a shallower impregnation tank can be used as compared with a method of manufacturing a battery component involving dip impregnation. Accordingly, the amount of solid electrolyte slurry required in the second step (to be described later) can be reduced, and the agglomeration of solid electrolyte slurry and the resulting non-uniform composition can be inhibited. This results in a reduction in the manufacturing cost.

In this step, the base having a three-dimensional structure may be positioned in the impregnation tank so that, as shown in FIG. 1, the base is fixed inside the impregnation tank. Alternatively, as shown in FIG. 2, the base having a three-dimensional structure may be positioned so that it is movable in the impregnation tank in the second step which will be explained below. Alternatively, as shown in FIG. 3, the base may be positioned so that the base fed from the feeding roll fits into the impregnation tank. In either positioning method, a conventional known method can be adopted.

Examples of methods of positioning a base having a three-dimensional structure in an impregnation tank using a fixture include a method in which a first fixture that grips both ends of the base defined with respect to either the longitudinal or lateral direction, and a second fixture that can be fixed while the base and the first fixture are held in the slurry container in the impregnation tank are provided and fixed inside or outside the impregnation tank (see (a) in FIG. 1 and (a) in FIG. 2). In addition, the first fixture and the second fixture are connected to each other by wires, chains, belts, and other known connecting tools. It should be noted that the "first fixture" and the "second fixture" may be collectively referred to simply as "fixture" herein.

Another method of positioning a base having a three-dimensional structure in an impregnation tank includes, for example, disposing a feeding roll for use to feed the base into the impregnation tank outside the impregnation tank, and feeding the base from the feeding roll to the slurry container located in the impregnation tank (see (a) in FIG. 3). In this positioning method, an end of the base positioned in the impregnation tank should not necessarily be positioned using fixtures. In this case, an end of the base fed from the feeding roll can move freely in the impregnation tank. Further, use of fixtures and a step related to cleaning can be omitted.

When the end of the base having a three-dimensional structure positioned in the impregnation tank is positioned in the impregnation tank using fixtures, the deformation of the base can be inhibited. As a result, the base can be uniformly impregnated with the solid electrolyte slurry while air can be efficiently removed from the inside of the base.

In the case where the base is fed from the feeding roll to the impregnation tank, examples of preferred characteristics of the base include resistance to folding or bending and damage or the like caused when the base is fed out or comes in contact with or is impregnated with solid electrolyte slurry. This is because the base resistant to folding or bending and damage or the like can be impregnated uniformly with solid electrolyte slurry.

Still another method of positioning the base having a three-dimensional structure in the impregnation tank is to simply place the base on the impregnation tank.

The base having a three-dimensional structure used in the method of manufacturing the battery component according to this embodiment is, for example, a mesh, a woven fabric, a non-woven fabric, an embossed body, a perforated body, an expanded body, a foam body, or the like, preferably a non-woven fabric. If the base having a three-dimensional structure is a non-woven fabric, in the method of manufacturing the battery component according to this embodiment, the base can be rapidly impregnated with solid electrolyte slurry, which makes it easier to reduce the manufacturing cost related to impregnation.

Any material that can constitute a free-standing sheet can be used for the base having a three-dimensional structure that constitutes the battery component according to this embodiment. Examples include polyethylene terephthalate, polyolefin, nylon, aramid, $Al_2O_3$, glass, and metal. In the case where a non-conductive material such as polyethylene terephthalate, polyolefin, nylon, aramid, $Al_2O_3$, or glass is used as the material for the base having a three-dimensional structure, an application can be made to a method of manufacturing a solid electrolyte sheet, and in the case where a conductive material such as a metallic material is used as the material for the base having a three-dimensional structure, an application can be made to a method of manufacturing an electrode layer.

The porosity of the base having a three-dimensional structure constituting the battery component according to this embodiment is preferably in the range of 60 to 95%. The porosity is more preferably 70 to 90%, particularly 80 to 90%. The porosity in this range makes it easier to impregnate the base having a three-dimensional structure with the solid electrolyte slurry by the method of manufacturing the solid electrolyte sheet of the present invention, which leads to a reduction in the lead time, thereby reducing the manufacturing cost.

The thickness of the base having a three-dimensional structure for the method of manufacturing the battery component according to this embodiment is preferably in the range of 5 to 30 μm. The thickness of the base is more preferably in the range of 5 to 20 μm, particularly in the range of 10 to 20 μm. If the thickness is less than 5 μm, a short circuit may occur between electrodes when a battery is formed. In contrast, if the thickness is more than 30 μm, it is difficult to make the density of energy to the base having a three-dimensional structure high in the battery component.

[Second Step]

The second step is the step of feeding the solid electrolyte slurry to the base positioned in the impregnation tank while keeping the solid electrolyte slurry flowing, thereby impregnating the base with the solid electrolyte slurry. In the method of manufacturing the battery component according to this embodiment, after the base having a three-dimensional structure is positioned in the impregnation tank, solid electrolyte slurry is fed into the impregnation tank so that it flows in a certain direction, thereby uniformly impregnating the inside of the base with the solid electrolyte slurry while suppressing agglomeration of the solid electrolyte slurry. This allows a large quantity of high-quality battery components to be stably manufactured at high speed (see (a) in FIG. 1 and (a) in FIG. 2).

In this step, the solid electrolyte slurry is fed into the impregnation tank through the feeding pipe 5 used to feed the solid electrolyte slurry into the impregnation tank, for example, using a pump to transport the solid electrolyte slurry from the tank holding the solid electrolyte slurry to the impregnation tank (which except for the feeding pipe 5 are not shown in the drawing). Further, the solid electrolyte slurry is impregnated into the base having a three-dimensional structure by the action of pressure gradient and capillary action.

In this step, it is preferable to feed the solid electrolyte slurry to the base while keeping the solid electrolyte slurry flowing such that the back side of the base facing the bottom of the impregnation tank is immersed in the solid electrolyte slurry and the front side of the base is exposed (see (a) in FIG. 1 and (a) in FIG. 2). In this step, impregnation of the solid electrolyte slurry proceeds in the direction of the thickness of the base having a three-dimensional structure from the back side faring the bottom of the impregnation tank toward the opposite side. At this time, the back side of the base facing the bottom of the impregnation tank is immersed in the solid electrolyte slurry and the front side of the base is exposed, which maximizes the effect of the pressure gradient caused inside the base when compared to the case where the base having a three-dimensional structure is fully immersed in the solid electrolyte slurry, thereby enabling rapid impregnation with the solid electrolyte slurry while effectively displacing and removing air (see (a) and (c) in FIG. 1, (a) and (c) in FIG. 2, and, (a) and (c) in FIG. 3).

In this step, as shown in FIG. 2, when the base having a three-dimensional structure is positioned so that it is movable in the impregnation tank, it is preferable to impregnate the base with the solid electrolyte slurry while the solid electrolyte slurry flows in the impregnation tank and, at the same time, the base is moved in the impregnation tank. In the case where the base having a three-dimensional structure is impregnated with the flowing solid electrolyte slurry, it is preferable to move the base approximately parallel with the bottom surface of the impregnation tank (see (a) and (c) in FIG. 2). At this time, it is preferable to move the base having a three-dimensional structure in the direction opposite to the flow direction of the solid electrolyte slurry to be described later, in order to maximize the pressure gradient generated in the base having a three-dimensional structure.

Examples of methods of positioning the base having a three-dimensional structure so that it is movable in the impregnation tank include a method in which at least the first fixture or the second fixture is provided with a mover that delivers a wire at one side while collecting the wire at the other side so that it is movable in the impregnation tank (see (a) and (c) in FIG. 2). This mechanism may be a rotating mechanism with chains and sprockets.

In the case where the base having a three-dimensional structure is fed from a feeding roll into the impregnation tank, the base is fed from the feeding roll at a constant feed rate, and the base feed rate and the flow rate of the solid electrolyte slurry are adjusted, which enables adjustment of the tension, buoyancy, and pressure generated between the base and the solid electrolyte slurry and the amount of solid electrolyte slurry impregnated into the base. This enables uniform impregnation of solid electrolyte slurry while removing air from the inside of the base.

In the case where the base having a three-dimensional structure is fed from a feeding roll into the impregnation tank, and the end of the base fed from the feeding roll is positioned in the impregnation tank using fixtures, providing the aforementioned mover to at least the first fixture or the second fixture makes the base movable in the impregnation tank.

In the case where the base having a three-dimensional structure is positioned so that it is movable in the impregnation tank, it is preferable to position the base so that it is movable in approximately parallel with the bottom surface of the impregnation tank (see (a) and (c) in FIG. 2). It is also preferable to move the base in the direction opposite to the flow direction of the solid electrolyte slurry, which will be described later, in order to maximize the pressure gradient generated in the base having a three-dimensional structure.

A known method can be used to make the solid electrolyte slurry flow in a certain direction while feeding the solid electrolyte slurry into the impregnation tank. Examples include a method in which agitator blades are installed at the bottom of the impregnation tank and rotated at a certain speed, and a method in which additional piping, a pump, and the like are connected to the impregnation tank so that solid electrolyte slurry is circulated. In this way, non-uniformity of composition caused, for example, by agglomeration of particles dispersed in the solid electrolyte slurry can be suppressed, which allows a high-quality battery component to be stably manufactured while keeping the manufacturing cost low.

Further, the method of manufacturing a battery component according to this embodiment preferably includes a third step in which, when the solid electrolyte slurry is fed up to the side opposite to the back side of the base facing the bottom surface of the impregnation tank, the base having a three-dimensional structure is vertically flipped, and the flowing solid electrolyte slurry is then fed to the base positioned in the impregnation tank again, thereby impregnating the base with the solid electrolyte slurry (see (b) and (c) in FIG. 1, (b) and (c) in FIG. 2, and, (b) and (c) in FIG. 3).

A known method can be used as the method of interchanging the front and back sides for immersion of the base having a three-dimensional structure. In the case where the base having a three-dimensional structure is positioned in the impregnation tank using fixtures, for example, a method in which the fixtures on the base having a three-dimensional structure are temporarily removed from the impregnation tank to interchange the front and back sides can be used. In the case where the base is positioned in the impregnation tank without fixtures, for example, a method in which the base is held with a jig and then is flipped over to interchange the front and back sides to be placed on the solid electrolyte slurry can be used. In the case where the base is fed from the feeding roll into the impregnation tank, for example, a method in which, in the impregnation tank, the base is separated from the roll and then is flipped over to interchange the front and back sides for immersion can be used.

Further, the method of manufacturing a battery component according to this embodiment preferably includes a fourth step in which the base is removed from the impregnation tank after impregnation of the solid electrolyte slurry into the base from both sides defined with respect to the direction of the thickness of the base having a three-dimensional structure (see (d) in FIG. 1, (d) in FIG. 2, and (d) in FIG. 3). The taken-out base is dried, completing manufacture of the solid electrolyte sheet. At this time, if the base is fixed using fixtures, the fixtures on the base are also removed.

The solid electrolyte slurry to be impregnated into the base having a three-dimensional structure by the method of manufacturing a battery component according to this embodiment may be any slurry that contains at least a solid electrolyte capable of conducting lithium ions between the positive electrode and the negative electrode. Examples of such a solid electrolyte include oxide electrolytes or sulfide electrolytes. In addition, other components such as a binder may be added as necessary to solid electrolyte slurry to be charged into the base having a three-dimensional structure. In the case where an electrode active material is further added to the solid electrolyte slurry, an application can be made to the method of manufacturing an electrode layer.

The solid electrolyte slurry used in the method of manufacturing the battery component of the present invention preferably contains lithium elements. If the solid electrolyte contains lithium elements, its lithium ion conductivity is high.

To be specific, the solid electrolyte is preferably a substance that contains at least lithium sulfide and one or more compounds selected from the group consisting of silicon sulfide, phosphorus sulfide, and boron sulfide as a second component, and $Li_2S—P_2S_5$, in particular, is preferred. Such a sulfide-based solid electrolyte is known to have higher lithium ion conductivity than other inorganic compounds, and may also contain sulfides such as $SiS_2$, $GeS_2$, and $B_2S_3$ as well as $Li_2S—P_2S_5$. In addition, $Li_3PO_4$, halogen, a halogen compound, or like may be added to the solid electrolyte as appropriate.

The solid electrolyte may contain a lithium ion conductor of an inorganic compound as an inorganic solid electrolyte. Examples of lithium ion conductors include $Li_3N$, LISICON, $LIPON(Li_{3+y}PO_{4-x}N_x)$, Thio-LISICON $(Li_{3.25}Ge_{0.25}P_{0.75}S_4)$, and $Li_2O—Al_2O_3—TiO_2—P_2O_5$ (LATP).

The solid electrolyte may be amorphous, glassy, crystalline (crystallized glass), or any other structure. When the solid electrolyte is a sulfide solid electrolyte of $Li_2S—P_2S_5$, its lithium ion conductivity in the amorphous state is $10^{-4}$ $Scm^{-1}$. On the other hand, its lithium ion conductivity in the crystalline state is $10^{-3}$ $Scm^{-1}$.

In the method of manufacturing the battery component of the present invention, the solid electrolyte used as the solid electrolyte slurry preferably contains phosphorus and/or sulfur. If the solid electrolyte further contains phosphorus and/or sulfur, the ionic conductivity of the resulting solid-state battery can be improved.

The method of manufacturing a battery component of the present invention can be used as the aforementioned method of manufacturing a solid electrolyte sheet, and can also be used as the method of manufacturing a battery component such as an electrode layer, making various additions, changes, or deletions without departing from the scope of the invention.

<Apparatus for Manufacturing Battery Component>

The apparatus for manufacturing a battery component according to this embodiment includes an impregnation tank for containing a solid electrolyte slurry, a positioner for positioning a base having a three-dimensional structure in the impregnation tank, and a feeder for feeding the solid electrolyte slurry to the base positioned in the impregnation tank while keeping the solid electrolyte slurry flowing to impregnate the base having a three-dimensional structure with the solid electrolyte slurry. This embodiment with the aforementioned configuration, for example, can provide an apparatus for manufacturing a battery component that can implement the method of manufacturing a battery component of the present invention. The apparatus for manufacturing a battery component according to this embodiment with the aforementioned configuration can inhibit or reduce the agglomeration of solid electrolyte slurry and the selective impregnation of small-size particles and the like into the base having a three-dimensional structure which occurs during impregnation of a porous material, thereby inhibiting or reducing the non-uniformity of the composition of the solid electrolyte slurry. In addition, the apparatus for manufacturing a battery component according to this embodiment can eliminate the need to prepare a larger amount of solid electrolyte slurry than the amount of slurry to be impregnated into the base having a three-dimensional structure, and also reduce an increase in the manufacturing cost caused by the need for long impregnation processing to remove air from the porous material. As described in detail below, various additions, changes, or deletions can be made without departing from the scope of the present invention.

[Impregnation Tank]

The apparatus for manufacturing the battery component according to this embodiment includes an impregnation tank to contain solid electrolyte slurry. The impregnation tank included in the apparatus for manufacturing the battery component according to this embodiment can be equipped with a known mechanisms necessary for impregnation. For example, it may include a feeder for feeding solid electrolyte slurry, an inlet for joining the feeder and the impregnation tank, a slurry container joined to the inlet and configured to contain the solid electrolyte slurry, and a discharge mechanism having discharge piping, a pump, and the like that can discharge the solid electrolyte slurry out of the impregnation tank upon completion of manufacture of the battery component (which are not shown in the drawing).

[Positioner]

The apparatus for manufacturing the battery component according to this embodiment includes a positioner for positioning the base having a three-dimensional structure in the impregnation tank (see (a) and (c) in FIG. 1, (a) and (c) in FIG. 2, and, (a) and (c) in FIG. 3). One embodiment of such a positioner is a positioner that includes, for example, a first fixture that holds at least one end of the base having a three-dimensional structure defined with respect to either the longitudinal or lateral direction, and a second fixture that can fix the base having a three-dimensional structure and the first fixture being held in the impregnation tank, the first fixture and the second fixture being joined to each other (see (a) and (c) in FIG. 1, and, (a) and (c) in FIG. 2). In the case where the base is positioned in the impregnation tank using fixtures, it is preferable to use the fixtures at both ends of the base defined with respect to the longitudinal or lateral direction of the base in order to achieve uniform impregnation of the solid electrolyte slurry.

Another embodiment of the positioner may be, for example, a positioner that includes at least a feeding roll for feeding the base having a three-dimensional structure into the impregnation tank, and a feeding roll control mechanism capable of feeding the base from the feeding roll at a certain feed rate and stopping it at a desired time or position (see (a) in FIG. 3). With such a positioner, the base can be positioned in the impregnation tank without fixtures. Note that a fixture may be used at one end of the base fed from the feeding roll to position it in the impregnation tank.

The positioner preferably includes, for example, a mover as well for making the base having a three-dimensional structure movable by feeding a wire at one side and collecting the wire at the other side in at least the first fixture or the second fixture (see (a) and (c) in FIG. 2). In the case where the base having a three-dimensional structure is positioned so that it is movable in the impregnation tank through the mover, it is preferable that the base having a three-dimensional structure be movable in a direction approximately parallel to the bottom surface of the impregnation tank. The mover may be a mechanism consisting of a motor, chains, and sprockets.

The positioner included in the apparatus for manufacturing the battery component according to this embodiment is preferably configured to optionally fix the positioner outside the impregnation tank but by interchanging the front and back sides of the base having a three-dimensional structure just by flipping over the positioner (see (b) in FIG. 1 and (b) in FIG. 2). For example, upon completion of impregnation up to the top surface of the side opposite to the side to be impregnated with the solid electrolyte slurry, after the second fixture is removed from the impregnation tank and the front and back sides for immersion are interchanged, the second fixture is attached to the impregnation tank again. Alternatively, after the second fixture is removed from the impregnation tank and the entire fixing mechanism of the base is then rotated with respect to the tank, the second fixture may be attached to the impregnation tank again to vertically flip the base having a three-dimensional structure to reverse the side to be immersed.

The positioner included in the battery component according to this embodiment is preferably configured to position the base having a three-dimensional structure in the impregnation tank so that the longitudinal direction of the base and the bottom surface of the impregnation tank are approximately parallel. This makes the impregnation tank shallower than the apparatus for manufacturing the battery component that carries out dip impregnation. The resulting apparatus for manufacturing a battery component leads to a reduction in the required amount of solid electrolyte slurry, inhibition of agglomeration of the solid electrolyte slurry and the resulting non-uniform composition, and a reduction in the manufacturing cost.

In addition, the positioner included in the battery component according to this embodiment is preferably configured to position the base having a three-dimensional structure in the impregnation tank so that the back side of the base facing the bottom surface of the impregnation tank is immersed in the solid electrolyte slurry and the front side of the base is exposed (see (a) and (c) in FIG. 1, (a) and (c) in FIG. 2, and, (a) and (c) in FIG. 3).

The materials that have been given for the method of manufacturing the battery component are suitable for the base having a three-dimensional structure that can be used for the apparatus for manufacturing the battery component according to this embodiment. In the case where the base is fed into the impregnation tank through the feeding roll, the material is preferably resistant to folding or bending and damage or the like caused when the base is fed out or comes in contact with or is impregnated with solid electrolyte slurry. Such a material allows uniform impregnation of the solid electrolyte slurry to be achieved in short time.

[Feeder]

The apparatus for manufacturing the battery component according to this embodiment includes a feeder for feeding the solid electrolyte slurry to the base having a three-dimensional structure positioned in the impregnation tank while keeping the solid electrolyte slurry flowing, thereby impregnating the base with the solid electrolyte slurry. The aforementioned feeder may include a known mechanism. The apparatus for manufacturing the battery component according to this embodiment may include, for example, a tank for holding solid electrolyte slurry, a feeding pipe 5 for feeding the solid electrolyte slurry to the impregnation tank, and a pump for transporting the solid electrolyte slurry through the pipe to the impregnation tank (which, except part of the feeding pipe, are not shown in the drawing).

The aforementioned feeder preferably feeds the solid electrolyte slurry to the base while keeping the solid electrolyte slurry flowing so that the back side of the base facing the bottom surface of the impregnation tank is immersed in the solid electrolyte slurry and the front side of the base is exposed. This allows the solid electrolyte slurry to be rapidly and uniformly impregnated into the base having a three-dimensional structure while air is rapidly and effectively displaced and removed by a pressure gradient and capillary action, as compared to the apparatus for manufacturing the battery component that carries out dip impregnation.

The aforementioned feeder may include a mechanism configured to make the solid electrolyte slurry flow in a certain direction to the impregnation tank while feeding the solid electrolyte slurry into the impregnation tank. Such a mechanism can employ any known mechanism. For example, a mechanism in which agitator blades are installed at the bottom of the impregnation tank and rotated at a certain speed by a motor and controller, or a mechanism in which an additional pipe and pump are connected to the impregnation tank to circulate solid electrolyte slurry. In this way, non-uniformity of composition caused, for example, by agglomeration of particles dispersed in the solid electrolyte slurry can be further reduced or inhibited, so that the resulting apparatus for manufacturing the battery component can reduce the manufacturing cost related to the impregnation and can stably manufacture high-quality battery components.

The apparatus for manufacturing the battery component according to this embodiment is used not only for solid electrolyte sheets but, without being limited to the aforementioned embodiment, can also be used to manufacture positive electrode layers and negative electrode layers, adjusting the base having a three-dimensional structure or slurry as appropriate.

EXPLANATION OF REFERENCE NUMERALS

1: Battery component
2, 201: Base having three-dimensional structure
3. 301: Impregnation tank
4, 401: Solid electrolyte slurry
5: Feeding pipe
10, 20, 30: Apparatus for manufacturing battery component
11, 21: First fixture
12, 22: Second fixture
33: Feeding roll
F: Flow direction of solid electrolyte slurry
M: Direction of motion of base having three-dimensional structure

What is claimed is:

1. A method of manufacturing a battery component, the method comprising:
   a first step of positioning a base having a three-dimensional structure in an impregnation tank; and
   a second step of feeding a solid electrolyte slurry to the base positioned in the impregnation tank while keeping the solid electrolyte slurry flowing in a certain direction, thereby impregnating the base with the solid electrolyte slurry,
   wherein, in the second step, the solid electrolyte slurry is supplied to the substrate while flowing, with the back surface side of the substrate, which faces the bottom surface of the impregnation treatment tank, being immersed in the solid electrolyte slurry and the front surface side of the substrate being exposed.

2. The method of manufacturing a battery component according to claim 1, wherein in the first step, the base is positioned such that a longitudinal direction of the base becomes approximately parallel to a bottom surface of the impregnation tank.

3. The method of manufacturing a battery component according to claim 1, wherein in the second step, the base is impregnated with the solid electrolyte slurry while being moved approximately parallel to a bottom surface of the impregnation tank.

4. An apparatus for manufacturing a battery component, the apparatus comprising:
   an impregnation tank for containing a solid electrolyte slurry;
   a positioner for positioning a base having a three-dimensional structure in the impregnation tank; and
   a feeder for feeding the solid electrolyte slurry to the base positioned in the impregnation tank while keeping the solid electrolyte slurry flowing in a certain direction, thereby impregnating the base with the solid electrolyte slurry,
   wherein the feeder feeds the solid electrolyte slurry to the base while keeping the solid electrolyte slurry flowing such that a back side of the base facing a bottom surface of the impregnation tank is immersed in the solid electrolyte slurry and a front side of the base is exposed.

5. The apparatus for manufacturing a battery component according to claim 4, wherein the positioner positions the base in the impregnation tank such that a longitudinal direction of the base becomes approximately parallel to a bottom surface of the impregnation tank.

6. The apparatus for manufacturing a battery component according to claim 4, wherein the positioner includes a mover that moves the base approximately parallel to a bottom surface of the impregnation tank.

7. A method for manufacturing a battery component, the method comprising:
   a first step of positioning a base having a three-dimensional structure in an impregnation tank; and
   a second step of feeding a solid electrolyte slurry to the base positioned in the impregnation tank while keeping the solid electrolyte slurry flowing, thereby impregnating the base with the solid electrolyte slurry, and
   a third step in which, when the solid electrolyte slurry is fed up to the side opposite to the back side of the base facing the bottom surface of the impregnation tank, the base having a three-dimensional structure is vertically flipped, and the flowing solid electrolyte slurry is then fed to the base positioned in the impregnation tank again, thereby impregnating the base with the solid electrolyte slurry.

8. An apparatus for manufacturing a battery component, the apparatus comprising:

an impregnation tank for containing a solid electrolyte slurry;

a positioner for positioning a base having a three-dimensional structure in the impregnation tank; and a feeder for feeding the solid electrolyte slurry to the base positioned in the impregnation tank while keeping the solid electrolyte slurry flowing in a certain direction, thereby impregnating the base with the solid electrolyte slurry, and wherein the positioner includes a first fixture that holds at least one end of the base having a three-dimensional structure defined with respect to either the longitudinal or lateral direction, and a second fixture that can fix the base having a three-dimensional structure and the first fixture being held in the impregnation tank, the first fixture and the second fixture being joined to each other.

\* \* \* \* \*